United States Patent [19]

Englmeier

[11] Patent Number: 5,423,549

[45] Date of Patent: Jun. 13, 1995

[54] APPARATUS WITH A SIGNAL RECEIVING UNIT FOR LOCATING GOLF BALLS

[75] Inventor: Martin Englmeier, Lenting, Germany

[73] Assignee: IPU Int. Patents Utilization Ltd., Channel Islands

[21] Appl. No.: 920,443

[22] PCT Filed: Mar. 2, 1991

[86] PCT No.: PCT/EP91/00395

§ 371 Date: Aug. 26, 1992

§ 102(e) Date: Aug. 26, 1992

[87] PCT Pub. No.: WO91/13655

PCT Pub. Date: Sep. 19, 1991

[30] Foreign Application Priority Data

Mar. 9, 1990 [DE] Germany .................. 40 07 454.4

[51] Int. Cl.6 .............................................. A63B 43/00
[52] U.S. Cl. ................................... 273/213; 273/58 G
[58] Field of Search ............. 273/213, 62, 58 R, 58 G

[56] References Cited

U.S. PATENT DOCUMENTS 3,782,730  1/1974  Horchler ........................ 273/213
4,660,039  4/1987  Barricks et al. ................ 273/213
5,083,113  1/1992  Slawinski et al. ............. 273/58 G

FOREIGN PATENT DOCUMENTS 2616335  12/1988  France ........................... 273/213
1172449  11/1969  United Kingdom .
8902768   4/1989  WIPO ............................ 273/213

OTHER PUBLICATIONS

Transistorized Golf Ball, "Radio Electronics", Jun. 1956 p. 79.

Primary Examiner—Jessica J. Harrison
Attorney, Agent, or Firm—Evenson, McKeown, Edwards & Lenahan

[57] ABSTRACT

The invention relates to a device with a signal receiving unit for locating golf balls. Each golf ball is associated with a transmitting unit and the signals emitted by each transmitting unit are detected by the signal receiving unit. The transmitting unit is associated with an energy store as an operating voltage source. The device includes a charging circuit with an energy transmitter for wireless transmission of the electrical energy to an energy receiver connected in front of the energy store. Immediately after the charging phase of the energy store, the transmitting unit starts sending transmission signals and in so doing discharges the energy store. The transmitted signals received by the signal receiving unit are fed to an evaluation circuit which produces an output signal for locating the golf ball. This output signal is then fed to a display unit. After a certain discharge time, the transmitting unit stops transmitting the transmission signals. The golf ball is located only during this limited transmission time. Golf balls which have been mishit can be located rapidly and simply using the device.

19 Claims, 3 Drawing Sheets

APPARATUS WITH A SIGNAL RECEIVING UNIT FOR LOCATING GOLF BALLS

BACKGROUND AND SUMMARY OF THE INVENTION

The invention relates to a device for the location of golf balls comprising a transmitter unit which is arranged in the golf ball which can be actuated by means of a control unit and which transmits electromagnetic locating signals and an associated electrical storage capacitor which is likewise accommodated in the golf ball and serves as the energy store, with the storage capacitor being rechargeable for a temporally restricted operating period by means of an energy receiver arranged in the golf ball and by means of an external energy transmitter, and further comprising a portable or mobile signal receiving unit which responds to the locating signal and also an associated evaluating circuit for generating directionally dependent signals for the localization of the golf ball.

A corresponding device is known from WO-A 89/02 768. A lost golf ball can be found again in principle with this device, however account is not taken of the fact that the search for a golf ball can be made more difficult by the location signals of other golf balls. Account must namely be taken of the fact that golf balls lost by relatively many players will simply be left lying on the terrain even with the availability of a corresponding search device for locating the lost ball. This will lead to a relatively large number of balls always being present in the terrain which transmit location signals with reducing intensity corresponding to the remaining residual capacity of the energy store which supplies the transmitter units of the balls, and this can cause considerable disturbance when searching for a freshly lost ball.

Similar problems occur with devices in accordance with GB-A 11 72 449. In accordance with this document the transmitter unit arranged in the ball can be formed as a reflector for high frequency signals which are generated in an external detector which then receives the signals reflected back by the ball-side reflector and evaluates them to locate the golf ball. The ball-side transmitter unit is thus formed as a passive transmitter which draws its operating energy from a high frequency field. A similar system is also described in German utility model 87 09 503. Here the ball-side reflectors each consist of a two part foil antenna with a Varactor diode connected between their inner ends, with the Varactor diode bringing about a frequency doubling of the reflected high frequency signal. All such systems in which the golf ball contains a passive transmitter have however, the disadvantage that a lost golf ball which is left lying on the golf course, i.e. is forgotten or not sought, will at once again become active in transmission when a detector is set into operation. In this way the finding of a further lost golf ball can be made impossible or very difficult.

In GB-A 11 72 449 it is indeed proposed to provide golf balls with radioactive material the half life of which far exceeds the normal life of a golf ball. Such golf balls can admittedly be located in principle with detectors which respond to radioactive radiation, however the searching of a specific golf ball is made considerably more difficult through further golf balls lying in terrain since all lost balls are radioactive in a basically similar manner.

Accordingly it is the object of the invention to provide an arrangement for finding specific individual golf balls while precluding as far as possible sources of disturbance caused by other golf balls.

This and other objects are satisfied in accordance with the invention in an apparatus of the initially named kind in that the energy store is provided as the operating voltage source of a constant current source which supplies the transmitter unit of the golf ball and also of a control unit which actuates the transmitter unit, with the energy store having a capacity which is dimensioned for a temporally restricted operating period of the control unit and/or of the transmitter unit.

In the system of the invention it is ensured through the constant current source that the ball-side transmitter unit generates locating signals with constant intensity during the transmitter operation. At the same time the transmitter operation is restricted timewise since the transmitter unit can only operate as long as the residual capacity of the energy store is sufficient to operate the control unit or the constant current source. In this manner it is possible to reliably prevent the transmitter unit being able to transmit disturbing signals over a longer period of time with reducing intensity in accordance with the residual capacity of the energy store.

After the termination of the transmission operation of the transmitter unit of a golf ball, renewed operation is only then possible when the golf ball has been found and recharged. In this way it can be reliably ensured that the localization of another golf ball is not hindered in undesirable manner.

In accordance with a further preferred embodiment of the invention the transmitter unit is controlled by a control unit, connected to the energy store in such a way that the transmitter unit generates periodic transmission signals. In consequence of this such a device has only a small current requirement so that the energy store also only needs to be dimensioned for a small current requirement.

This kind of a control unit is realized in a particularly preferred embodiment of the invention in that it includes an astable flip-flop and a subsequent differentiation stage, whereby a rectangular waveform signal generated by the astable flip-flop is supplied to the differentiator stage and a transistor switch which is provided for pulsed operation of the transmitter unit is controlled by the output signal of the differentiator stage. In this way a simple circuit needed for the pulsed operation is obtained.

In order to simultaneously locate several golf balls, provision is made in a particularly preferred embodiment of the invention for the transmitter units to have a certain number of transmission frequencies, with one of these transmission frequencies being associated in each case with groups of golf balls formed at the manufacturer in such a way that the transmitter units of the golf balls belonging to a group each transmit at the same frequency, and furthermore each golf ball has a code for the identification of the transmission frequency. For this purpose the reception frequencies of the signal receiving units are adjustable to these transmission frequencies.

Furthermore, for the simultaneous location of several golf balls, a further advantageous embodiment of the invention results in that the charging signals of the energy transmitter are coded and different transmission frequencies of the transmitter unit can be set through this coding, with the reception frequency of the signal receiving unit being in each case tunable thereto. A further development of this embodiment consists in that a microprocessor is provided at the transmitter unit for decoding the coded charging signals and for setting the transmission frequency; and in that this microprocessor controls a decoder, a programmable frequency divider and a PLL (phase-locked loop) circuit.

For the rapid finding of a golf ball the output signal of the evaluation circuit represents, a signal which is dependent on the field strength of the transmitted signal, with the value of this field strength depending on the orientation of an antenna associated with the signal receiving unit and its distance from the golf ball to be sought.

For the better determination of the directional characteristic of the transmission signal, the signal receiving unit can in particular be equipped in accordance with another advantageous development of the invention with a multiple antenna diversity system, wherein, in accordance with a further development of this embodiment, the display unit sets forth the direction in which the golf ball to be sought is located independently of the orientation of the antennas.

Furthermore, the display unit is so laid out in a favorable embodiment of the invention that it transmits optical and/or acoustical signals.

In a particularly advantageous further development of the invention, the energy store is a capacitor.

Finally, in a particularly advantageous embodiment of the invention the signal receiving unit, the charging circuit and the charging device are arranged in a portable housing, with the golf ball containing the transmitter unit with the energy receiver and the energy store and optionally the control unit; and in that the charging device is formed as a charging golf bag for the receiving of the golf balls.

Other objects, advantages and novel features of the present invention will become apparent from the following detailed description of the invention when considered in conjunction with the accompanying drawings.

BRIEF DESCRIPTION OF THE DRAWINGS

The invention will be explained in more detail in the following with respect to several embodiments and with reference to the drawings. There are shown.

DETAILED DESCRIPTION OF THE DRAWINGS

Figure 1:
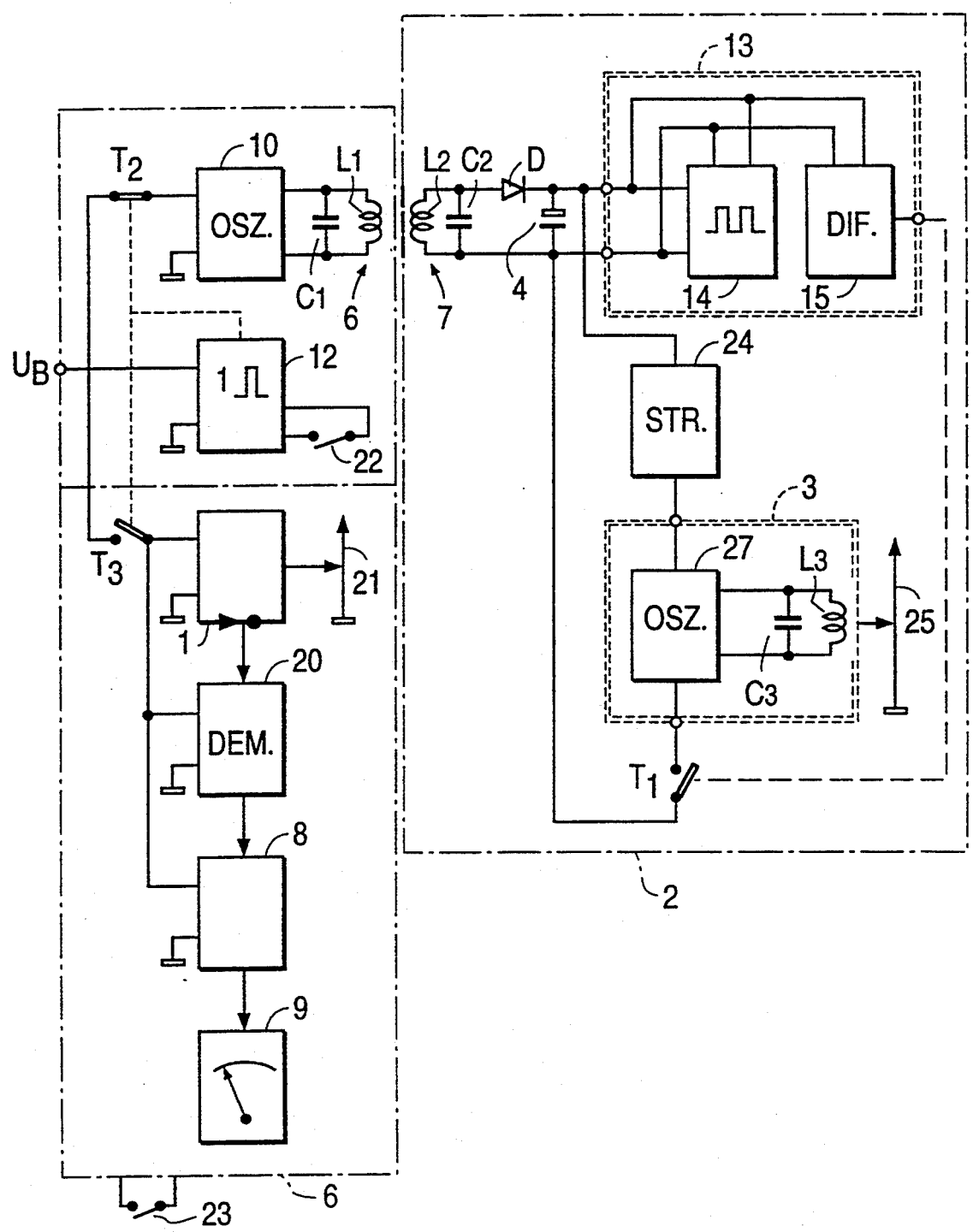
FIG. 1 is a block circuit diagram of an embodiment of the apparatus of the invention.

FIG. 1 shows two block circuit diagrams which are respectively framed by a continuous line and designated with the reference signs a and b respectively. The circuit arrangement a is accommodated in the golf ball 2 to be located in accordance with FIG. 3 while the circuit arrangement b is built up in a portable housing 26 in accordance with FIG. 4. The golf ball of FIG. 3 and also this hand device (portable housing) 26 will first be described further below. First of all the circuit arrangement b should be explained. There a charging circuit 5 is shown in the upper part of the rectangle surrounding the circuit arrangement b and comprises of an energy transmitter 6, an oscillator 10 and a monostable flip-flop 12. The energy transmitter 6 is built up as an oscillating circuit with an oscillating circuit coil L1 and an oscillating circuit capacitor C1 and is tuned to a specific charging frequency. The energy transmitter 6 is fed in accordance with FIG. 1 by the oscillator 10. This oscillator 10 is connected via a transistor switch T2 with an operating voltage source $U_B$, which is in turn controlled by 2 monostable flip-flop 12 which in its turn receives a controlled pulse via a switch 22. In this way this flip-flop 12 drops into its stable state, whereby the transistor switch T2 connects the oscillator 10 to the operating voltage source $U_B$ with the consequence, that the energy transmitter 6 starts transmitting charging signals. If the monostable flip-flop falls back into its stable starting position, then the oscillator 10 is separated from the operating voltage source $UP_B$ and is connected via a further transistor switch T3, a signal receiving unit 1 and its subsequent components with the reference numerals 8 and 20 to the operating voltage source $U_B$. These circuit components are shown in the lower part of the rectangle which frames the circuit arrangement b. Thus the signal receiving unit 1 starts to receive immediately after the charging phase.

The energy irradiated by the energy transmitter 6 is received by an energy receiver 7 of the circuit arrangement a which is constructed as a resonant circuit with an oscillating circuit coil L2 and with an oscillator circuit capacitor C2 as a parallel circuit. A further capacitor is connected in parallel with the oscillating circuit capacitor C2 via a rectifier diode D and serves as a storage capacitor 4 for the storage of the received energy following rectification through the rectifier diode D. This energy store 4 then serves as an operating voltage source for the subsequent components, in this case a control unit 13 and a constant current source 24. During the charging phase of the storage capacitor 4, the energy transmitter 6 and the energy receiver 7 are arranged spatially adjacent one another, which is indicated by graphic proximity of these two parallel circuits. In the practical arrangement this is explained further below with reference to FIG. 4. Through an arrangement of these two oscillating circuits of this kind reproducible charging conditions arise in advantageous manner.

As soon as the energy store 4 is charged, the subsequent components 13 and 24 and in particular the transmitter unit 3 starts to work, i.e. transmitter signals are radiated via the antenna 25 of the transmitter unit 3. The transmitter unit 3 comprises of an oscillator 27 which controls an oscillating circuit comprising a capacitor C3 and a coil L3. The oscillator 27 is connected to the constant current source 24 which supplies the oscillator 27 with a constant current despite a reducing operating voltage. The oscillator 27 is furthermore connected via a transistor switch T1 to the storage capacitor 4 in order to generate a pulsed transmission signal for the purpose of energy saving. Accordingly the switching transistor T1 is controlled by the clock pulses generated by the control unit 13. This control unit 13 includes an astable flip-flop 14 and a differentiating stage 15 connected after the flip-flop 14. The output of this differentiating stage 15 is connected to the transistor switch T1. For the energy supply this astable flip-flop 14 as well as the differentiating stage 15 is connected to the energy store 4 while the signal input of the astable flip-flop 14 is likewise connected to this storage capacitor 4. At the output of the astable flip-flop stage 14 a rectangular oscillation is available with a pulse space ratio of for example 1:1 which is differentiated by the differentiating stage 15 to generate short pulses. The pulsed transmission signals irradiated by the transmission antenna 25 are received by a receiving antenna 21 of the signal receiving unit 1 of the circuit arrangement b.

A demodulator 20 and an evaluation unit 8 are connected after this signal receiving unit 1 and these components are supplied with an operating voltage $U_B$. The evaluation circuit 8 contains a sample and hold circuit to which the demodulated signal of the demodulator 20 is fed. The signal generated by this evaluating unit 8 is directly proportional to the value of the received field strength. Since a rod antenna is used as the antenna 21 a directionally dependent signal results which is supplied to a measurement device 9 connected after the evaluation unit 8. This measuring instrument which serves as a location display is for example a moving coil instrument. The circuit arrangement b is set in operation via a switch 23.

Figure 2:
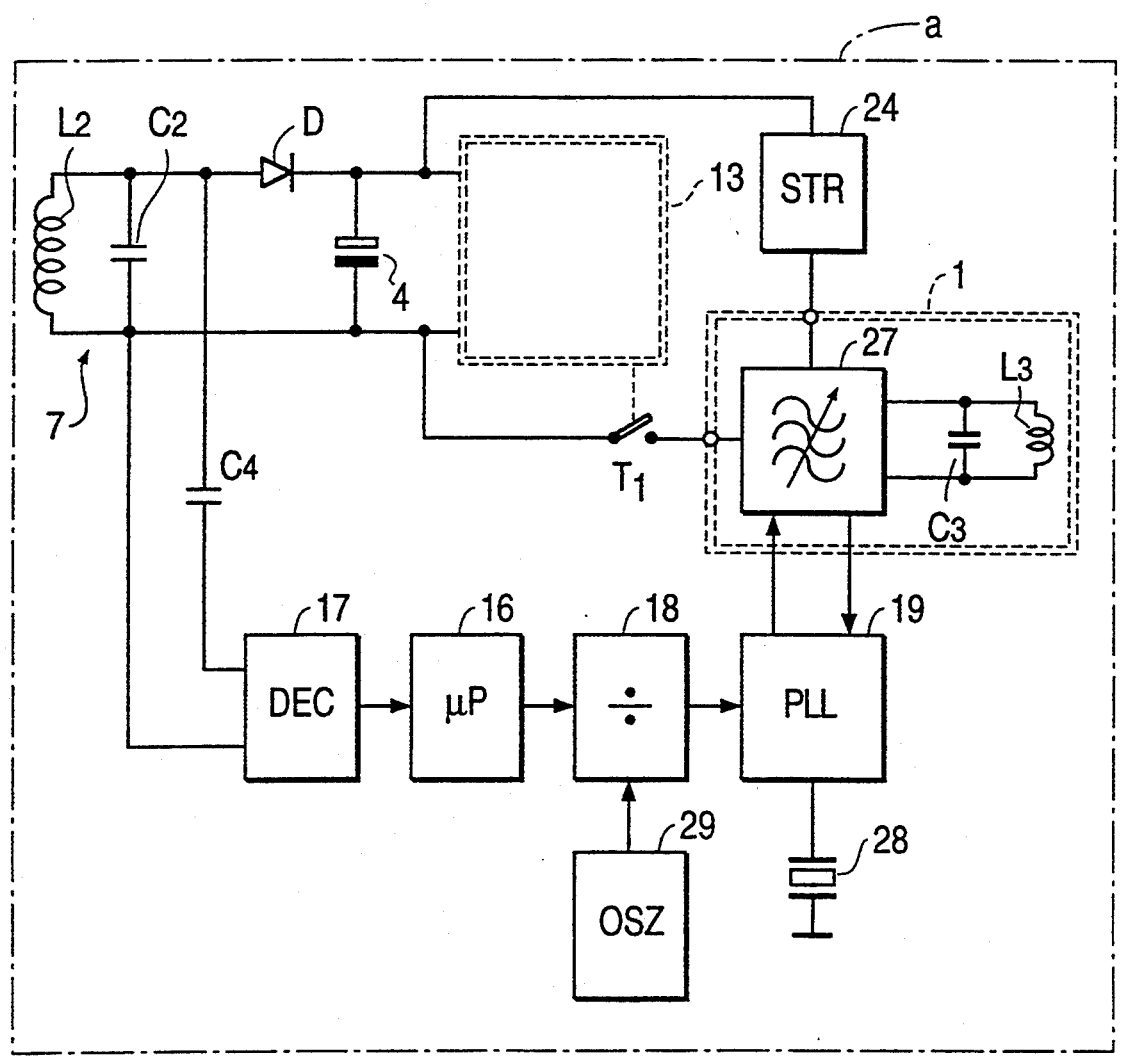
FIG. 2 is a block circuit diagram of an embodiment of a circuit with a transmission frequency adjustment and housed in a golf ball to be located.

FIG. 2 shows a circuit arrangement a with the possibility of setting specific transmission frequencies in order to hereby simultaneously detect different golf balls. This is realized in that the charging signal of the energy transmitter 6 represents a coded charging signal, for example PCM-modulated (Pulse Code Modulated). This charging signal received by the energy receiver 7 is tapped off in accordance with FIG. 2 at the oscillating circuit capacitor C2 and is supplied via a coupling capacitor C4 to a decoder 17. A microprocessor 16 evaluates the decoded signals and controls in turn a programmable frequency divider 18 in accordance with the coded frequency in the received charging signal. The programmable frequency divider 18 supplied by the oscillator 29 controls a PLL (Phase Locked Loop) circuit 19 which in turn controls the voltage controlled oscillator 27 of the transmitter unit 1. The PLL circuit 19 is supplied with a reference frequency from an oscillator quartz 28. For the generation of PCM modulated charging signals through the charging circuit 5 the latter receives corresponding circuit means which are known to the person skilled in the art and which will not therefore be further explained here. In the same manner the signal receiving unit 1 of the circuit arrangement b has adjustment possibilities for the reception of the different frequencies.

Figure 3:
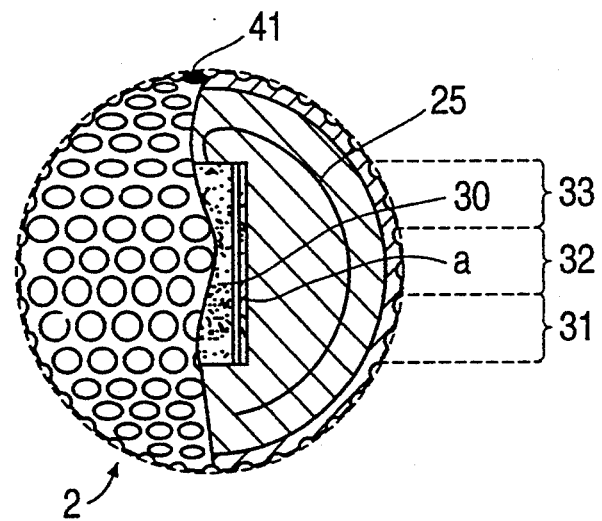
FIG. 3 is a schematic illustration of a golf ball with an electronic system in accordance with the device of the invention.

In FIG. 3 a golf ball 2 is now shown which contains an electronic circuit 30 which corresponds to the circuit arrangement a of FIG. 1 or of FIG. 2. This electronic circuit 30 is split up in accordance with the reference numerals 31, 32 and 33 into three different functional areas. The area 31 contains the energy receiver, the area 32 serves for the energy storage and the area 33 contains the transmitter unit with the associated components. Furthermore, the transmitter antenna 35 which is executed as a wire is also shown. This electronic circuit 30 is cast together with its antenna 25 into the innermost layer of the golf ball 2, with this inner core additionally being surrounded by several layers. A marking point 41 on the surface of the golf ball represents the location where the energy receiver 7 is opposite to the circuit arrangement a. The sense of this marking 41 will be explained further below in connection with FIG. 4.

Figure 4:
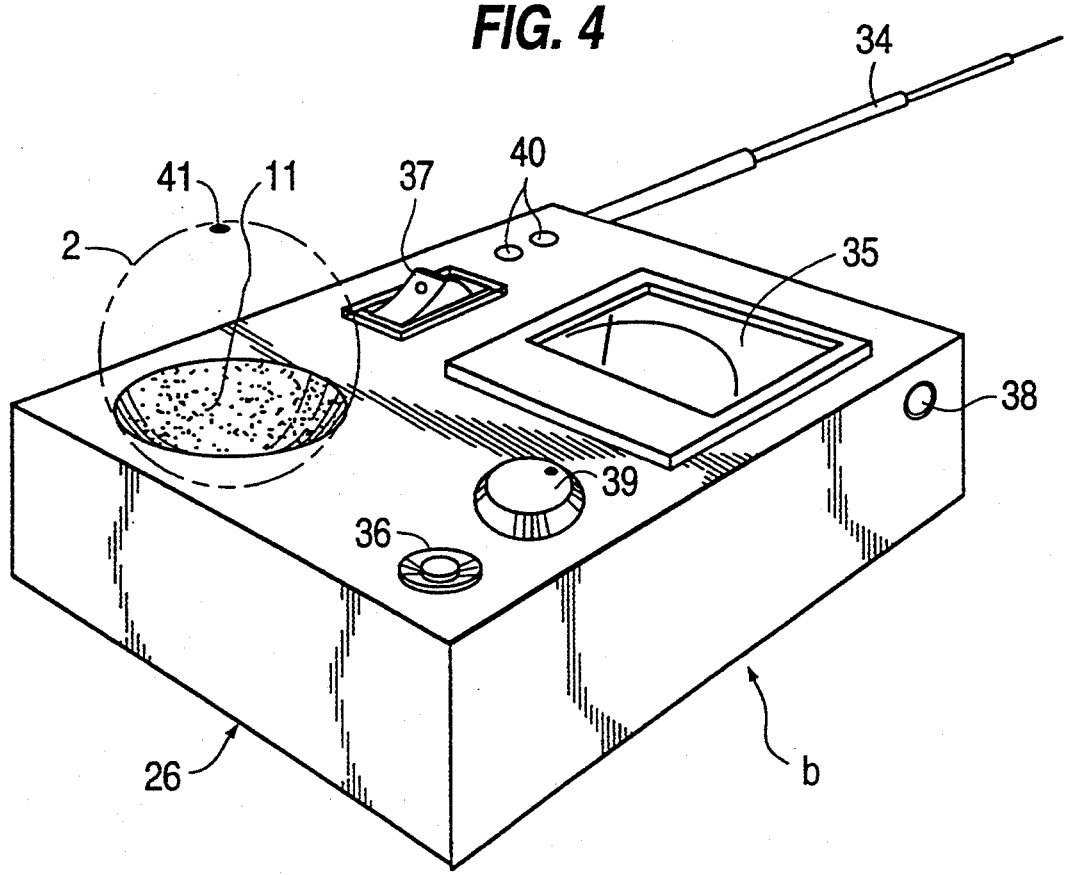
FIG. 4 is a perspective illustration of an embodiment of the device of the invention.

FIG. 4 now shows an embodiment of a searching device for finding a golf ball 2 in accordance with FIG. 3. This searching device is formed as a rectangular portable housing 26 and contains a circuit arrangement b in accordance with FIG. 1. For the charging procedure a golf ball of the kind shown in FIG. 1 is laid into the charging bag into an opening 11 provided for this purpose. In this respect it should be noted that the marking 41 on the golf ball points upwardly whereby it is guaranteed that the energy receiver in the region 31 of the golf ball 2 is located in the immediate spatial proximity of the energy transmitter 6 located at the base of the charging bag 11. The searching device is now set into operation via an on/off key 36, whereby the charging procedure takes place automatically and lasts for example for 6 seconds. During the charging procedure a charging display 40 arranged on an end face of the housing 26 lights up. After the end of charging the signal receiving unit automatically switches on and this is likewise shown by the receiver display 40. If the charging procedure has now been carried out in an orderly manner then the measuring instrument 25 which now operates as a field strength instrument shows at once the transmission of the signal by the ball. Finally, the ball can be taken from the charging bag 11 and placed for the searching procedure on the terrain. The signal transmission of the golf ball is effective for approximately 15 minutes after charging has been completed, with a capacitor of 100~F having been selected for the charging capacitor 4 of the circuit arrangement a of FIG. 1 or of FIG. 2. The corresponding charging frequency lies at approximately 1 MHz.

For the searching procedure the searching device remains switched on after the charging up of the golf ball. A telescope antenna 35 is drawn out fully and a receiving switch 37 is set to "remote", i.e. to a highest sensitivity stage. The display on the measuring instrument 35 will now start to deflect. With a tuning knob 39 the deflection of the display can be set to the maximum display value (optimum search). First of all the course direction can be determined in which the golf ball is located through rotation of the entire searching device and of the searcher. By walking forward slowly in this direction the deflection of the display will increase. If the measurement range should be exceeded on approaching the ball then the sensitivity switch 37 can be brought into a "close" position. The needle of the measuring instrument 35 can now move again on the scale and the search for the golf ball can be continued. After the search for the golf ball has been successful the searching device is switched off via the switch 36. After the renewed switching on of this switch 36 the charging of the next golf ball can begin at once. The searching device in accordance with FIG. 4 furthermore contains a loud speaker sleeve 38 to which a headphone can be connected which gives amplified short sound signals when the searching device approaches the golf ball 2.

So that several players on a golf course can simultaneously seek their lost golf balls it is necessary for these to transmit at different frequencies. For this purpose a different transmission frequency is in each case associated with groups of golf balls formed at the works, so that the transmitter units of the golf balls belonging to one group all transmit at the same frequency. In order to distinguish the individual groups the golf balls have on their surface a code which simultaneously recites the transmission frequency. The search device includes a means with which the signal receiving unit can be set to the corresponding frequency.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A device, comprising:
    a golf ball;
    a transmitter unit disposed within the golf ball;
    a constant current source disposed within the golf ball and coupled to the transmitter unit;
    a control unit disposed within the golf ball and coupled to the transmitter unit and which actuates the transmitter unit to cause said transmitter unit to transmit electromagnetic locating signals;
    an electrical storage capacitor disposed within the golf ball, the storage capacitor being coupled to the transmitter unit and serving as an energy store, wherein the storage capacitor is an operating voltage source of the constant current source;
    an energy receiver disposed within the golf ball, coupled to the storage capacitor, that recharges the storage capacitor for a temporally restricted operating period;
    a charging circuit that includes an external energy transmitter having an oscillating circuit tuned to a charging frequency of approximately 1 MHz and is electrically coupleable to the energy receiver;
    an oscillator coupled to the oscillating circuit;
    a mobile signal receiving unit responsive to the locating signals and providing output signals; and
    an evaluating circuit coupled to receive the output signals of the mobile signal receiving unit, the evaluating circuit generating directionally dependent signals for the localization of the golf ball;
    wherein the energy receiver is a resonant circuit tuned to said charging frequency.

2. Device in accordance with claim 1, further comprising a rectifier element coupled to the resonant circuit such that electrical energy picked up by the resonant circuit is rectified and supplied to the storage capacitor.

3. Device in accordance with claim 1, wherein the electrical coupling between the energy transmitter and the energy receiver is an inductive.

4. Device in accordance with claim 1, further comprising a charging device for the golf ball for the charging of the storage capacitor, the charging device being coupled to the charging circuit, said charging device configured such that the energy receiver is located during a charging procedure in direct spatial proximity to the energy transmitter.

5. Device in accordance with claim 1, wherein the signal receiving unit is immediately operable after the storage capacitor is charged.

6. Device in accordance with claim 5, further comprising a monostable flip-flop coupled to the mobile signal receiving unit and the energy transmitter to control the mobile signal receiving unit and the energy transmitter; wherein the energy transmitter is active and the mobile signal receiving unit is inactive only during an astable state of the monostable flip-flop and the mobile signal receiving unit is ready to receive only during a stable state of the monostable flip-flop.

7. Device in accordance with claim 1 wherein said control unit is coupled to the transmitter unit and the storage capacitor such that the transmitter unit generates pulsed transmission signals.

8. Device in accordance with claim 7, wherein the control unit includes an astable flip-flop and a subsequent differentiating stage arranged such that a rectangular signal generated by the astable flip-flop is supplied to the differentiating stage, and further includes a transistor switch coupled to the differentiating stage and providing a pulsing of the transmitter unit wherein the transistor switch is controlled by an output of the differentiating stage.

9. Device in accordance with claim 1, wherein a plurality of transmission frequencies is provided for the transmitter unit; in that a specific transmission frequency is associated with the transmitter unit disposed within groups of golf balls formed at a specific manufacturer, in each case in such a way that the transmission units of the golf balls belonging to one group each transmit on the same frequency; each golf ball having a code to identify the transmission frequency; and in that a receiving frequency of the signal receiving is set to these transmission frequencies.

10. Device in accordance with claim 9, wherein charging signals of the energy transmitter are coded; and different transmission frequencies of the transmitter unit are set through this coding; and a reception frequency of the signal receiving unit is in each case tunable to the transmission frequencies.

11. Device in accordance with the claim 10, further comprising a microprocessor coupled to the transmitter unit, and that decodes the coded charging signal and sets the transmission frequency at the transmitter unit; said microprocessor coupled to and controlling a decoder, a programmable frequency divider and a phase-locked loop circuit.

12. Device in accordance with claim 1, further comprising an antenna coupled to the mobile signal receiving unit, wherein the evaluating circuit generates an output signal that represents a signal dependent on field strength of a received locating signal; the value of this field strength being dependent on orientation of the antenna and a distance of the antenna from the golf ball to be sought.

13. Device in accordance with claim 1, wherein the mobile signal receiving unit includes a multiple antenna diversity system operable to determine the directional characteristic of the locating signal.

14. Device in accordance with claim 13, further comprising a display unit coupled to the evaluating circuit, the display unit indicating the direction in which the golf ball which is to be sought is located independently of the orientation of the antennas.

15. Device in accordance with claim 14, wherein the display unit transmits at least one of optical and acoustical signals.

16. Device in accordance with claim 1, further comprising a portable housing for housing the mobile signal receiving unit, the charging circuit and the charging device; and wherein the charging device is formed to receive the golf ball as a charging golf ball holder.

17. Device in accordance with claim 1, wherein the electrical coupling between the external energy transmitter and the energy receiver is a capacitive coupling.

18. A golf ball having an interior comprising:
    a transmitter unit in the golf ball interior;

a constant current source in the golf ball interior and coupled to the transmitter unit;

a control unit in the golf ball interior and coupled to the transmitter unit and which actuates the transmitter unit to cause said transmitter unit to transmit electromagnetic locating signals;

an electrical storage capacitor in the golf ball interior, the storage capacitor being coupled to the transmitter unit and serving as an energy store, wherein the storage capacitor is an operating voltage source of the constant current source; and an energy receiver in the golf ball interior and coupled to the storage capacitor to recharge the storage capacitor for a temporally restricted operating period.

19. A locating system comprising a golf ball and a locating device, said locating device including a transmitter unit disposed within the golf ball and which emits electromagnetic location signals; a storage capacitor disposed within the golf ball and which serves as an energy store for the transmitter unit; an energy receiver disposed within the golf ball; an external energy transmitter wirelessly coupled with the energy receiver in order to sufficiently charge the storage capacitor for a limited period of operation of the transmitter unit; a signal receiver unit which is responsive to the electromagnetic location signals; and an evaluation circuit associated therewith for producing direction-independent signals for locating the golf ball, the external energy transmitter comprising: an oscillator circuit operating at a pre-specified frequency, wherein the energy receiver is constructed as a resonator circuit matched to the pre-specified frequency, said energy receiver being brought into direct proximity to the energy transmitter, and wherein the transmitter unit starts emitting transmitter signals directly after the charging of the energy store and wherein the energy store discharges after a pre-specified discharging time.

* * * * *